(12) United States Patent
Yang et al.

(10) Patent No.: US 12,732,599 B2
(45) Date of Patent: Sep. 8, 2026

(54) ELECTRONIC DEVICE, METHOD, AND NON-TRANSITORY COMPUTER-READABLE STORAGE MEDIA FOR DISPLAYING OTHER VIDEO CORRESPONDING TO VIDEO DISPLAYED ON EXTERNAL ELECTRONIC DEVICE

(71) Applicant: Samsung Electronics Co., Ltd., Suwon-si (KR)

(72) Inventors: Changmo Yang, Suwon-si (KR); Seungjoon Lee, Suwon-si (KR); Younju Jin, Suwon-si (KR); Eunha Choi, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 19/278,257

(22) Filed: Jul. 23, 2025

(65) Prior Publication Data

US 2025/0350709 A1 Nov. 13, 2025

Related U.S. Application Data

(63) Continuation of application No. 18/405,445, filed on Jan. 5, 2024, now Pat. No. 12,395,613, which is a (Continued)

(30) Foreign Application Priority Data

Feb. 27, 2023 (KR) ........................ 10-2023-0026363

(51) Int. Cl.
*H04N 9/31* (2006.01)
*G06T 7/215* (2017.01)

(52) U.S. Cl.
CPC ........... *H04N 9/3188* (2013.01); *G06T 7/215* (2017.01); *G06T 2207/10016* (2013.01)

(58) Field of Classification Search
CPC ........ H04N 9/31; H04N 21/41; H04N 9/3188; H04N 21/436; H04N 21/4223;
(Continued)

(56) References Cited

U.S. PATENT DOCUMENTS 7,626,600 B2 12/2009 Matsuda
7,746,356 B2 6/2010 Meinders
(Continued)

FOREIGN PATENT DOCUMENTS

KR 100909858 B1 7/2009
KR 10-1278606 B1 6/2013
(Continued)

OTHER PUBLICATIONS

International Search Report dated Mar. 7, 2024, issued in International Application No. PCT/KR2023/018940.
(Continued)

*Primary Examiner* — Sherrie Hsia
(74) *Attorney, Agent, or Firm* — Jefferson IP Law, LLP

(57) ABSTRACT

An electronic device is provided. A processor of the electronic device may cause the electronic device to obtain first information for a first video displayable through a display of an external electronic device, from the external electronic device using a communication circuit. The processor may cause the electronic device to execute a scan on the first video using a plurality of images in the first video. may cause the electronic device to identify a time to be spent to obtain second information for displaying a second video expanded from the first video to be displayed through the display of the external electronic device, based on the scan. The disclosure relates to a metaverse service for enhancing interconnectivity between a real object and a virtual object.
(Continued)

For example, the metaverse service is provided through a network based on fifth generation (5G) and/or sixth generation (6G).

20 Claims, 10 Drawing Sheets

Related U.S. Application Data continuation of application No. PCT/KR2023/018940, filed on Nov. 22, 2023.

(58) Field of Classification Search
CPC ........... H04N 21/81; G06T 7/215; G06T 5/00; G06T 7/20; G06T 2207/10016
USPC ........ 348/739, 744, 556, 563, 569, 581, 596
See application file for complete search history.

(56) References Cited

U.S. PATENT DOCUMENTS 8,130,330 B2 3/2012 Tan et al.
8,599,313 B2 12/2013 Barenbrug et al.
9,217,914 B2 12/2015 Choi et al.
9,480,907 B2 11/2016 Benko et al.
10,297,179 B2 5/2019 Doi et al.
2007/0126938 A1 6/2007 Tan et al.
2012/0223885 A1 9/2012 Perez
2014/0051510 A1 2/2014 Benko et al.
2015/0077435 A1 3/2015 Koga
2017/0300192 A1 10/2017 Naour et al.
2017/0330495 A1 11/2017 Doi et al.
2018/0174555 A1 6/2018 Lee et al.

FOREIGN PATENT DOCUMENTS

KR 10-2014-0037433 A 3/2014
KR 101489262 B1 1/2015
KR 10-2016-0144253 A 12/2016
KR 10-1715937 B1 3/2017
KR 10-2020-0080818 7/2020
KR 10-2021-0109641 A 9/2021

OTHER PUBLICATIONS

Extended European Search Report dated Feb. 26, 2026, issued in a European Application No. 23925513.6.

ELECTRONIC DEVICE, METHOD, AND NON-TRANSITORY COMPUTER-READABLE STORAGE MEDIA FOR DISPLAYING OTHER VIDEO CORRESPONDING TO VIDEO DISPLAYED ON EXTERNAL ELECTRONIC DEVICE

CROSS-REFERENCE TO RELATED APPLICATION(S)

This application is a continuation application, of prior application Ser. No. 18/405,445, filed on Jan. 5, 2024, which is a continuation application, claiming priority under § 365 (c), of an International application No. PCT/KR2023/018940, filed on Nov. 22, 2023, which is based on and claims the benefit of a Korean patent application number 10-2023-0026363, filed on Feb. 27, 2023, in the Korean Intellectual Property Office, the disclosure of which is incorporated by reference herein in its entirety.

TECHNICAL FIELD

The disclosure relates to an electronic device, method, and non-transitory computer-readable storage media for displaying another video corresponding to a video displayed on an external electronic device.

BACKGROUND ART

An electronic device for visualizing information are being developed. The electronic device may include a television, a monitor, an electronic board, a beam projector, a mobile phone, and/or a tablet personal computer (PC). The electronic device may form a displaying area representing the information on a surface of the electronic device or a surface of exterior of the electronic device.

The above information is presented as background information only to assist with an understanding of the disclosure. No determination has been made, and no assertion is made, as to whether any of the above might be applicable as prior art with regard to the disclosure.

DISCLOSURE

Technical Solution

Aspects of the disclosure are to address at least the above-mentioned problems and/or disadvantages and to provide at least the advantages described below. Accordingly, an aspect of the disclosure is to provide an electronic device, method, and non-transitory computer-readable storage media for displaying another video corresponding to a video displayed on an external electronic device.

Additional aspects will be set forth in part in the description which follows and, in part, will be apparent from the description, or may be learned by practice of the presented embodiments.

In accordance with an aspect of the disclosure, an electronic device is provided. The electronic device may include a communication circuit, a projection assembly, a processor, and a memory 220 storing instructions. The instructions, when executed by the processor, cause the electronic device to obtain first information for a first video displayable through a display of an external electronic device, from the external electronic device using the communication circuit. The instructions, when executed by the processor, cause the electronic device to execute a scan on the first video using a plurality of images in the first video. The instructions, when executed by the processor, cause the electronic device to identify a time to be spent to obtain second information for displaying a second video expanded from the first video to be displayed through the display of the external electronic device, based on the scan. The instructions, when executed by the processor, cause the electronic device to provide a notification for informing the time. The instructions, when executed by the processor, cause the electronic device to after the time has elapsed, display the second video including a black area partially overlapping the first video displayed through the display of the external electronic device, based on the second information, using the projection assembly.

In accordance with another aspect of the disclosure, a method of an electronic device is provided. The method may comprise obtaining first information for a first video displayable through a display of an external electronic device, from the external electronic device using a communication circuit. The method may comprise executing a scan on the first video using a plurality of images in the first video. The method may comprise identifying a time to be spent to obtain second information for displaying a second video expanded from the first video to be displayed through the display of the external electronic device, based on the scan. The method may comprise providing a notification for informing the time. The method may comprise, after the time has elapsed, displaying the second video including a black area partially overlapping the first video displayed through the display of the external electronic device, based on the second information, using a projection assembly.

In accordance with another aspect of the disclosure, a non-transitory computer readable storage medium storing one or more programs including instructions is provided. The instructions, when executed by a processor of an electronic device, may cause the electronic device to obtain first information for a first video displayable through a display of an external electronic device, from the external electronic device using a communication circuit. The instructions, when executed by a processor of an electronic device, may cause the electronic device to execute a scan on the first video using a plurality of images in the first video. The instructions, when executed by a processor of an electronic device, may cause the electronic device to identify a time to be spent to obtain second information for displaying a second video expanded from the first video to be displayed through the display of the external electronic device, based on the scan. The instructions, when executed by a processor of an electronic device, may cause the electronic device to provide a notification for informing the time. The instructions, when executed by a processor of an electronic device, may cause the electronic device to after the time has elapsed, display the second video including a black area partially overlapping the first video displayed through the display of the external electronic device, based on the second information, using a projection assembly.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

Figure 1:
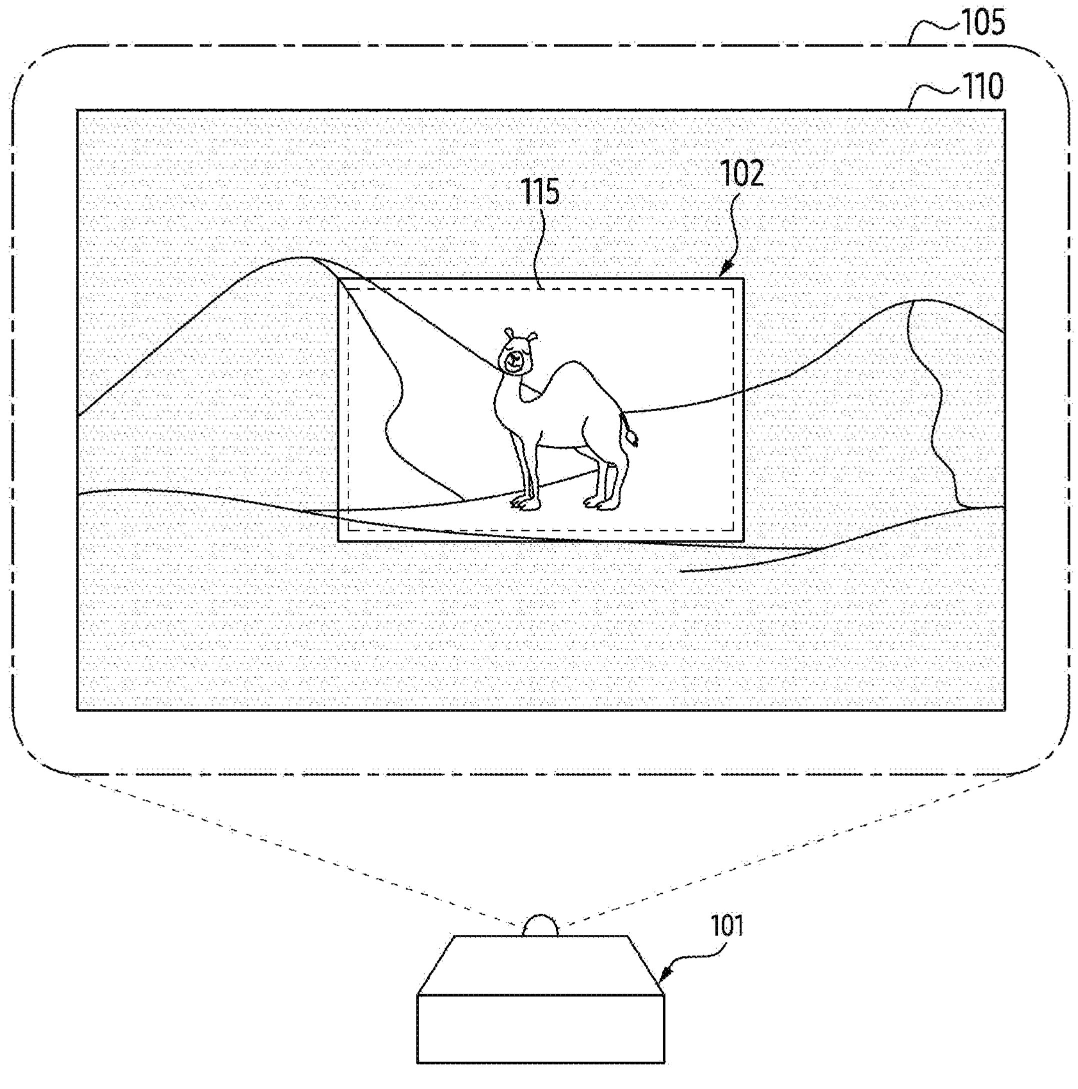
FIG. 1 illustrates an operation in which an electronic device displays a second video corresponding to a first video displayed on a display of an external electronic device according to an embodiment of the disclosure.

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Various embodiments of this document and terms used therein are not intended to limit a technology described in this document to a particular shape, but should be understood to include various changes, equivalents, and/or substitutes of the embodiment. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly, or via other element (e.g., a third element).

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

FIG. 1 illustrates an operation in which an electronic device displays a second video corresponding to a first video displayed on a display of an external electronic device according to an embodiment of the disclosure. Referring to FIG. 1, an electronic device 101 according to an embodiment may include a beam projector for emitting light to an external space. The electronic device 101 may output the light representing a screen (e.g., a video 110) formed by pixels arranged two-dimensionally. The light outputted from the electronic device 101 may be reflected by an object, such as a plane. A user of the electronic device 101 may view the screen based on the light reflected by the object.

Referring to FIG. 1, according to an embodiment of the disclosure, the electronic device 101 may identify at least one plane capable of projecting a screen (e.g., a video 110) represented by light, in an external space in which the light emitted by the electronic device 101 is reachable. According to an embodiment of the disclosure, the electronic device 101 may identify an external electronic device 102 for projecting light toward the at least one plane identified, using a communication circuit. For example, the electronic device 101 may identify the external electronic device 102 using a camera. The electronic device 101 may adjust a size of the video 110 to be projected on the at least one plane, based on a shape of the identified external electronic device 102.

For example, adjusting the size of the video 110 by the electronic device 101 may include adjusting a position in which the video 110 is displayed on at least one plane by controlling a projection assembly. The electronic device 101 may use a black area to adjust the size of the video 110. The black area may be used to prevent the electronic device 101 from overlapping at least a part of the video 110, on the external electronic device 102. An operation of generating the black area by the electronic device 101 will be described later in FIG. 5.

According to an embodiment of the disclosure, the electronic device 101 may establish a communication link with the external electronic device 102 using a communication circuit. In a state that the communication link is established, the electronic device 101 may display the video 110 related to a video 115 displayed on a display of the external electronic device 102, on a plane. A displaying area 105 in which the electronic device 101 displays the video 110 may have a rectangular shape with a specified ratio (e.g., an aspect ratio). However, it is not limited thereto.

For example, an operation in which the electronic device 101 displays the video 110 on the plane and an operation in which the external electronic device 102 displays the video 115 on the display may be performed substantially simultaneously through a communication link. The video 110 and the video 115 may be obtained by substantially similar information. For example, the electronic device 101 may generate the video 110 based on execution of at least one application using the video 115. An operation of generating the video 110 by the electronic device 101 will be described later with reference to FIG. 4.

According to an embodiment of the disclosure, a video displayed in the displaying area 105 by the electronic device 101 may be indicated by video data. For example, the video data may be stored in a memory of the electronic device 101 or transmitted from another electronic device (e.g., at least one server providing a streaming service, set-top box (STB), PC, and/or television (TV)) to the electronic device 101. The video data may include an image and/or a video. The video data may be streamed from a network connected by the electronic device 101. The image data may include a video and a sound synchronized with the video. The image data may include a video standardized by a motion picture expert group (MPEG). Other video 115 displayed in the display by the external electronic device 102 may be substantially similar to those described above.

According to an embodiment of the disclosure, the electronic device 101 may receive information on the video 115 that may be displayed through the display of the external electronic device 102 from the external electronic device 102 using the communication circuit. Based on scanning the video 115, the electronic device 101 may identify a time to be spent to obtain information for displaying (or generating) the video 110 expanded from the video 115. For example, the electronic device 101 may provide the user of the electronic device 101 with a notification for informing the identified time. For example, the time may be changed based on a size of the video 110 and/or the number of pixels included in the video 110. For example, when the time is set, the electronic device 101 may adjust the size of the video 110 and/or the number of pixels based on the time.

According to an embodiment of the disclosure, the electronic device 101 may receive an input indicating to play the video 110 from the external electronic device 102, after the time has elapsed. For example, the electronic device 101 may receive the input from a user of the electronic device 101. Based on receiving the input, a signal requesting play of the video 115 may be transmitted to the external electronic device 102. The electronic device 101 may display the video 110 synchronized with the video 115 using a projection assembly, while the video 115 is displayed on the display of the external electronic device 102. For example, the displaying area 105 in which the electronic device 101 projects the video 115 may cover at least a part of the external electronic device 102.

As described above, according to an embodiment of the disclosure, the electronic device 101 may identify a time for generating the video 110 extended from the video 115, by using the video 115. After the time has elapsed, while the external electronic device 102 displays the video 115 on the display, the video 110 may be outputted by controlling the projection assembly in a direction adjacent to the external electronic device 102. The electronic device 101 may provide a user with the video 115 based on a wider size, by projecting the video 110 synchronized with the video 115 to a periphery of the external electronic device 102.

Figure 2:
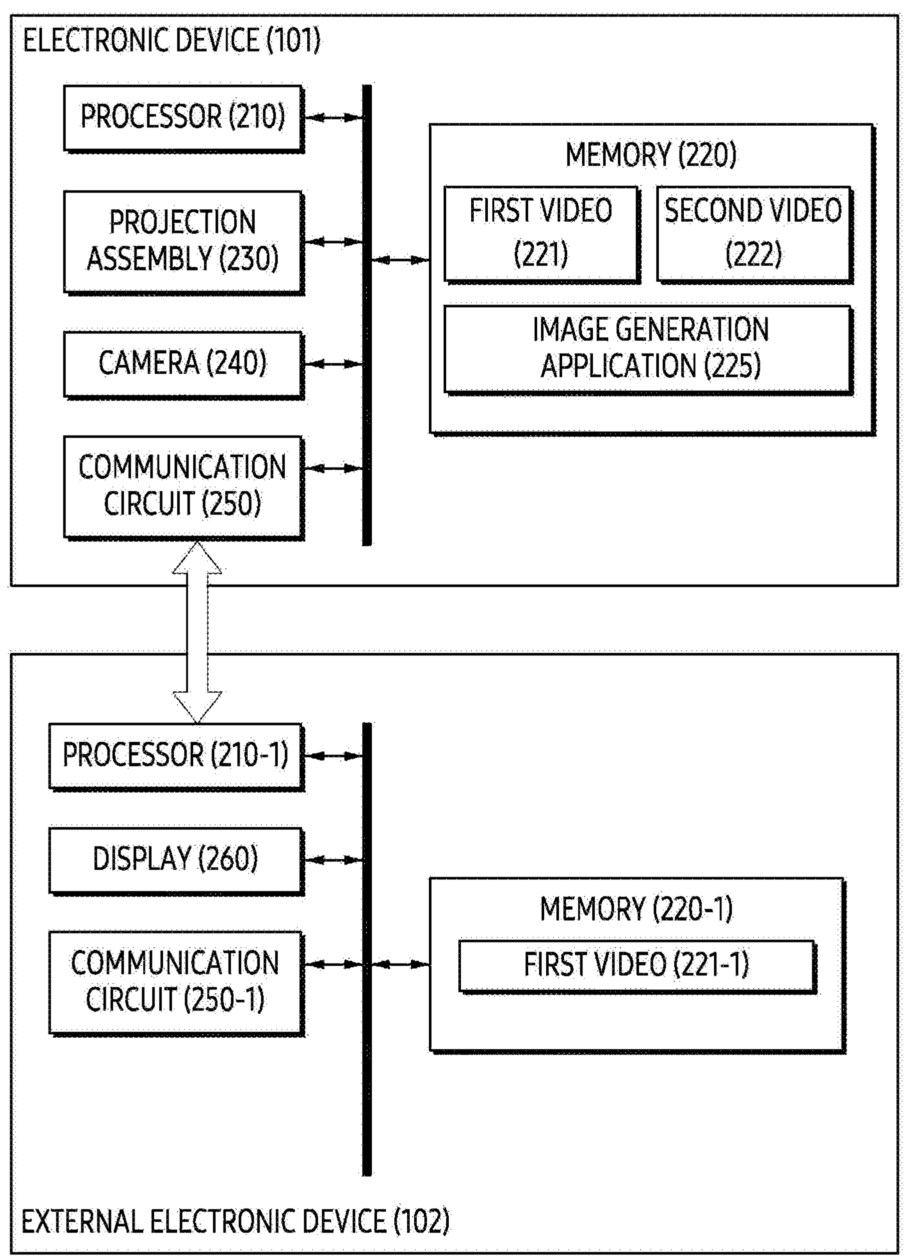
FIG. 2 illustrates a block diagram of an electronic device according to an embodiment of the disclosure.

FIG. 2 illustrates a block diagram of an electronic device, according to an embodiment of the disclosure. The electronic device 101 of FIG. 1 may be an example of the electronic device 101 of FIG. 2. The external electronic device 102 of FIG. 1 may be an example of the external electronic device 102 of FIG. 2.

Referring to FIG. 2, the electronic device 101 and the external electronic device 102 may be connected to each other, based on a wired network and/or a wireless network. The wired network may include a network, such as Internet, local area network (LAN), wide area network (WAN), Ethernet, or a combination thereof. The wireless network may include a network, such as long term evolution (LTE), fifth generation (5G) new radio (NR), wireless fidelity (Wi-Fi), Zigbee, near field communication (NFC), Bluetooth, Bluetooth low-energy (BLE), or a combination thereof. Although the electronic device 101 and the external electronic device 102 are illustrated to be directly connected, the electronic device 101 and the external electronic device 102 may be connected indirectly through an intermediate node (e.g., a router and/or an access point (AP)). For example, the electronic device 101 and the external electronic device 102 may be connected based on an interface, such as a high-definition multimedia interface (HDMI) and/or RCA.

Referring to FIG. 2, according to an embodiment of the disclosure, the electronic device 101 may include at least one of a processor 210, a memory 220, a projection assembly 230, a camera 240, or a communication circuit 250. The processor 210, the memory 220, the projection assembly 230, the camera 240, and the communication circuit 250 may be electrically and/or operably coupled with each other by an electronic component, such as a communication bus. Hereinafter, the operative coupling of hardware components may mean that a direct or indirect connection between hardware components is established by wire or wirelessly, so that a second hardware is controlled by a first hardware among the hardware components. Although illustrated based on different blocks, embodiments are not limited thereto, and a part (e.g., at least a part of the processor 210, the memory 220, and the communication circuit 250) of the hardware of FIG. 2 may be included in a single integrated circuit, such as a system on a chip (SoC). The types and/or numbers of hardware components included in the electronic device 101 are not limited to those illustrated in FIG. 2. For example, the electronic device 101 may include only a part of the hardware components illustrated in FIG. 2.

According to an embodiment of the disclosure, the processor 210 of the electronic device 101 may include a hardware component for processing data based on one or more instructions. For example, the hardware component for processing data may include an arithmetical and logical unit (ALU), a floating point unit (FPU), a field programmable gate array (FPGA), a central processing unit (CPU) and/or, application processor (AP). The number of processors 210 may be one or more. For example, the processor 120 may have a structure of a multi-core processor, such as a dual core, a quad core, or a hexa core.

According to an embodiment of the disclosure, the memory 220 of the electronic device 101 may include a hardware component for storing data and/or an instruction inputted to and/or outputted from the processor 120. The memory 220 may include a volatile memory, such as a random-access memory (RAM) and/or a non-volatile memory, such as a read-only memory (ROM). For example, the volatile memory may include at least one of a dynamic RAM (DRAM), a static RAM (SRAM), a Cache RAM, and a pseudo SRAM (PSRAM). For example, the non-volatile memory may include at least one of a programmable ROM (PROM), an erasable PROM (EPROM), an electrically erasable PROM (EEPROM), a flash memory, a hard disk, a compact disk, and an embedded multimedia card (eMMC).

According to an embodiment of the disclosure, one or more instructions (or commands) indicating calculation and/or operation to be performed on data by the processor 210 may be stored in the memory 220 of the electronic device 101. A set of one or more instructions may be referred to as a firmware, an operating system, a process, a routine, a sub-routine, and/or an application. For example, when a set of a plurality of instructions distributed in the form of operating system, firmware, driver, and/or application is executed, the electronic device 101 and/or the processor 210 may perform at least one of operations of FIG. 7. Hereinafter, the fact that an application is installed in the electronic device 101 may mean that one or more instructions provided in the form of an application are stored in the memory 220 of the electronic device 101, and that the one or more applications are stored in a format (e.g., a file with an extension specified by the operating system of the electronic device 101) executable by the processor 210 of the electronic device 101.

According to an embodiment of the disclosure, the electronic device 101 may generate a second video 222 corresponding to a first video 221 based on execution of an image generation application 225. The electronic device 101 may use information on the first video 221 stored in the memory 220. However, it is not limited thereto. For example, the electronic device 101 may obtain information on the first video 221 from the external electronic device 102 through the communication circuit 250. The first video 221 may be referred to the video 115 of FIG. 1.

For example, the electronic device 101 may obtain the second video 222 extended from the first video 221 based on execution of the image generation application 225, using the first video 221. The second video 222 may be referred to the video 110 of FIG. 1. In order to generate the second video 222, the electronic device 101 may obtain information for a space in which the electronic device 101 is located, using the camera 240. An operation of generating the second video 222 by the electronic device 101 will be described later with reference to FIGS. 3A and 3B.

For example, the electronic device 101 may adjust a size of the second video 222 by using the information on the space. However, it is not limited thereto. For example, the electronic device 101 may adjust the size of the second video 222 when projecting the second video 222 using the projection assembly 230.

For example, the electronic device 101 may identify a time for generating the second video 222. The electronic device 101 may provide a notification for informing the time to the user. The electronic device 101 may transmit a signal indicating the notification to the external electronic device 102 and/or another electronic device of the user, by using a communication circuit. The electronic device 101 may output an audio signal indicating the notification using a speaker (not shown). However, it is not limited thereto.

According to an embodiment of the disclosure, the projection assembly 230 of the electronic device 101 may include a plurality of hardware assembled to emit light representing pixels arranged two-dimensionally. For example, the projection assembly 230 may include a combination of cathode-ray tubes (CRTs) for emitting light of each of three primary colors in a color space and lenses for expanding the light emitted from each of the CRTs. For example, the projection assembly 230 may include a combination of a light source (e.g., a lamp) for emitting light, optical filters for dividing the light into light paths corresponding to each of the three primary colors, liquid crystal display (LCD) panels disposed on each of the light paths, and a prism and/or a lens for synthesizing light outputted from the LCD panels. For example, the projection assembly 230 may include a combination of a light source for emitting light, an optical filter selecting any one of the three primary colors from the light, a digital mirror device (DMD) for controlling reflection on the primary color filtered by the optical filter, and a lens for expanding light reflected by the DMD. In terms of requiring light projection for display of the screen, at least one of the illustrated combinations may be referred to as the projection assembly 230. In an embodiment of the disclosure, the electronic device 101 including the projection assembly 230 may be referred to as a beam projector.

According to an embodiment of the disclosure, the camera 240 of the electronic device 101 may include one or more optical sensors (a charged coupled device (CCD) sensor, a complementary metal oxide semiconductor (CMOS) sensor) that generate an electrical signal indicating color and/or brightness of light. A plurality of optical sensors in the camera 240 may be arranged in a shape of 2 dimensional array. By obtaining an electrical signal of each of the plurality of optical sensors substantially simultaneously, the camera 240 may correspond to light reaching the optical sensors of the 2-dimensional array and generate an image including a plurality of pixels arranged in 2 dimensions. For example, photo data captured using the camera 240 may mean an image obtained from the camera 240. For example, video data captured using the camera 240 may mean a sequence of a plurality of images obtained according to a specified frame rate from the camera 240.

According to an embodiment of the disclosure, the electronic device 101 may identify an external object included in an image and/or video obtained using the camera 240. Identifying an external object by the electronic device 101 may be performed based on a sensor to identify a distance between the electronic device 101 and the external object, such as a depth sensor and/or a time of flight (ToF) sensor. The depth sensor may include an ultra-wide band (UWB) sensor (or UWB radar) that uses a radio signal in a frequency band of the UWB. The depth sensor may include a time-of-flight (ToF) sensor that measures ToF of laser light and/or infrared light. The electronic device 101 may obtain a depth image including two-dimensionally arranged depth values using the ToF sensor. The ToF sensor may include an infrared diode and a plurality of infrared light sensors that detect intensity of infrared light and are arranged in a shape of 2-dimensional array. Using the ToF sensor, the electronic device 101 may obtain the depth image based on a time when light emitted from the infrared diode is reflected from a subject and reaches at least one of the plurality of infrared light sensors.

According to an embodiment of the disclosure, the electronic device 101 may identify a shape of the external electronic device 102 by using the camera 240. Based on the identification of the shape of the external electronic device 101, the electronic device 101 may generate a black area to be projected by overlapping the second video 222. An example of an operation of the electronic device 101 generating the black area will be described later with reference to FIG. 5.

According to an embodiment of the disclosure, the communication circuit 250 of the electronic device 101 may include hardware for supporting transmission and/or reception of an electrical signal between the electronic device 101 and the external electronic device 102. Although only the external electronic device 102 is illustrated as another electronic device connected through the communication circuit 250 of the electronic device 101, the embodiment is not limited thereto. For example, the communication circuit 250 may include at least one of a MODEM, an antenna, and an optical/electronic (O/E) converter. The communication circuit 250 may support transmission and/or reception of the electrical signal, based on various types of protocols, such as Ethernet, local area network (LAN), wide area network (WAN), wireless fidelity (Wi-Fi), Bluetooth low energy (BLE), ZigBee, long term evolution (LTE), and 5G new radio (NR).

According to an embodiment of the disclosure, the electronic device 101 may receive information on the first video 221 (or information indicating a screen) using the communication circuit 250. For example, the electronic device 101 may wirelessly receive a signal for displaying the first video 221 and/or the second video 222 through the communication circuit 250, based on a wireless communication protocol, such as a wireless display (WiDi) and/or a Miracast. For example, the electronic device 101 may receive a signal for displaying the first video 221 and/or the second video 222 by wire using the communication circuit 250, based on a wired communication protocol (or a wired interface), such as high-definition multimedia interface (HDMI), display port (DP), mobile high-definition link (MHL), digital visual interface (DVI) and/or D-subminiature (D-sub).

Referring to FIG. 2, the external electronic device 102 connected to the electronic device 101 may include at least one of a processor 210-1, a memory 220-1, a communication circuit 250-1, or a display 260. The processor 210-1, the memory 220-1, the communication circuit 250-1, and the display 260 may be electrically and/or operably connected to each other by a communication bus. The processor 210-1, the memory 220-1, and the communication circuit 250-1 in the external electronic device 102 of FIG. 2 may correspond to the processor 210, the memory 220, and the communication circuit 250 in the electronic device 101. In order to reduce repetition of description, descriptions overlapping the processor 210, the memory 220, and the communication circuit 250 may be omitted from among the descriptions of a processor 210-1, a memory 220-1, and a communication circuit 250-1.

According to an embodiment of the disclosure, the display 260 of the external electronic device 102 may output visualized information to a user. For example, the display 260 may be controlled by the processor 120 and/or a graphic processing unit (GPU) (not shown) to output visualized information to the user. The display 260 may include a flat panel display (FPD) and/or electronic paper. The FPD may include a liquid crystal display (LCD), a plasma display panel (PDP), a digital mirror device (DMD), one or more light emitting diodes (LEDs), and/or a micro LED. The LED may include an organic LED (OLED).

According to an embodiment of the disclosure, the electronic device 101 may establish a communication link with the external electronic device 102 using the communication circuit 250-1. In a state that the communication link is established, the electronic device 101 may transmit a signal indicating to display at least one video (e.g., the second video 222) to the external electronic device 102. Based on transmitting the signal, the electronic device 101 may display the second video 222 using the projection assembly 230 in a direction adjacent to the external electronic device 102. For example, the external electronic device 102 may display the first video 221 corresponding to the second video 222 on the display 260, in response to receiving the signal. Based on the communication link, the electronic device 101 and the external electronic device 102 may project the first video 221 and/or the second video 222 substantially simultaneously. For example, the electronic device 101 may display the second video 222 synchronized with the first video 221 by controlling the projection assembly 230, based on the communication link. For example, a first video 221-1 of the external electronic device 102 may be stored by information substantially similar to the first video 221.

According to an embodiment of the disclosure, based on identifying at least one external object, the electronic device 101 may adjust a displaying area (e.g., the displaying area 105 in FIG. 1) to which light of the projection assembly 230 is to be propagated, by using the camera 240. In order to prevent the light from propagating onto the at least one external object, the electronic device 101 may change a position of the displaying area by controlling the projection assembly 230. The electronic device 101 may adjust a position of a black area included in the second video 222 based on changing the position of the displaying area. However, it is not limited thereto. For example, the electronic device 101 may adjust a size of the second video 222 based on identifying the at least one external object, while generating the second video 222.

As described above, according to an embodiment of the disclosure, in a state that the communication link with the external electronic device 102 is established, the electronic device 101 may generate the second video 222 corresponding to the first video 221-1 to be displayed on the display of the external electronic device 102, based on execution of an image generation application 225. The electronic device 101 may identify a time for generating the second video 222. The time may be changed based on a state of the second video 222. The electronic device 101 may provide a displayable state of the second video 222 to the user using the time.

Hereinafter, an example of an operation in which the electronic device 101 adjusts a size of the second video 222 will be described later in FIGS. 3A and 3B.

Figure 3A:
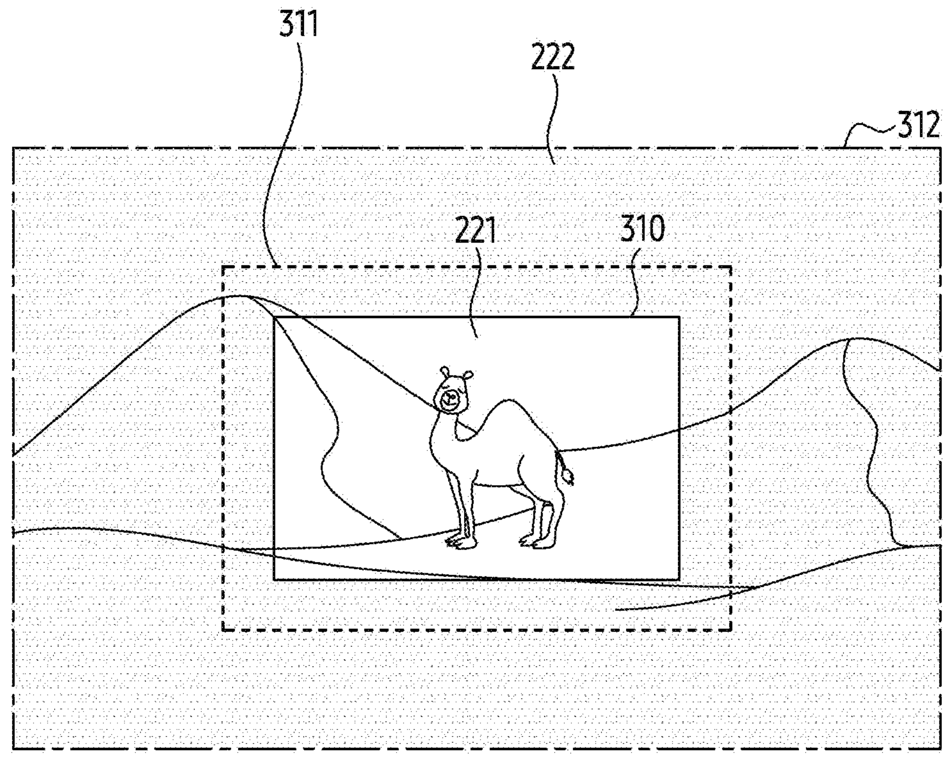
FIGS. 3A and 3B illustrate an operation in which an electronic device adjusts a size of a video according to various embodiments of the disclosure.
Figure 3B:
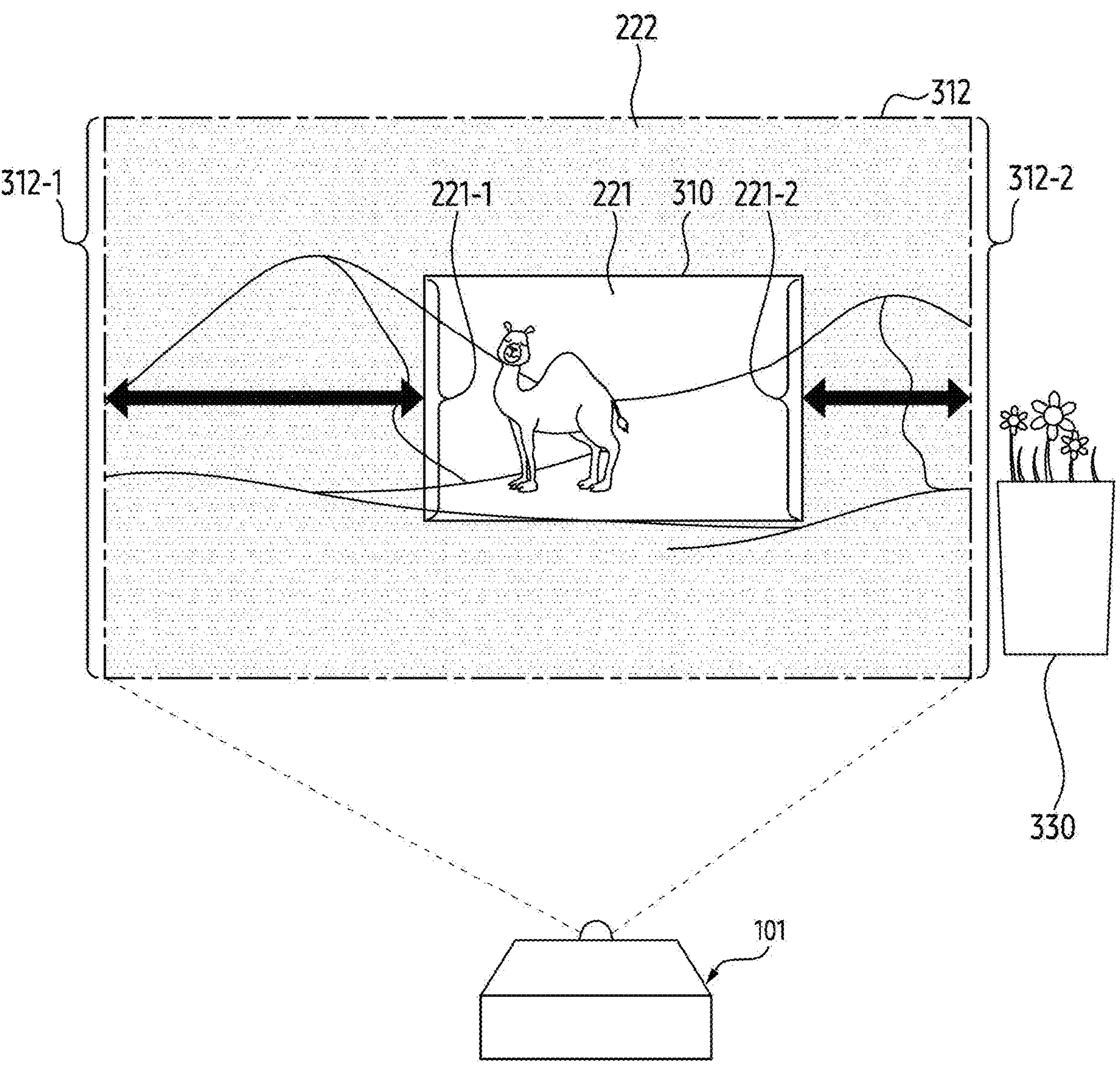

FIGS. 3A and 3B illustrate an operation in which an electronic device adjusts a size of a video, according to an embodiment of the disclosure. The electronic device of FIGS. 3A and 3B may be an example of the electronic device 101 of FIGS. 1 and 2.

Referring to FIG. 3A, according to an embodiment of the disclosure, the electronic device 101 may receive information on the first video 221 from an external electronic device (e.g., the external electronic device 102 of FIG. 1) through a communication circuit. The electronic device 101 may set a size of the second video for generating the second video 222 extended from the first video 221.

For example, the electronic device 101 may identify a size of a plane on which the second video is to be projected, by using a camera (e.g., the camera 240 in FIG. 2). The electronic device 101 may adjust the size of the second video, based on identifying the size of the plane. The electronic device 101 may expand the first video 221, based on a position of the external electronic device. For example, a shape of the second video extended from the first video 221 may be different according to the position of the external electronic device in the plane.

For example, the size of the second video extended from the first video 221 may be larger than a size 310 of the first video 221. The electronic device 101 may generate the second video 222 based on a size 311 and/or a size 312. The electronic device 101 may generate the second video 222 based on at least one selected in response to an input indicating to select at least one of the size 311 or the size 312, from another external electronic device of the user.

According to an embodiment of the disclosure, the electronic device 101 may adjust the number of pixels included in the second video 222, independently of identifying the size of the second video 222. Adjusting the number of pixels included in the second video may include adjusting quality of the second video 222. Adjusting the quality of the second video may include adjusting a frame rate of the second video, brightness of the second video, color of the second video, and/or a bit rate corresponding to the second video. For example, the electronic device 101 may receive a user's input for adjusting the number of pixels included in the second video. The electronic device 101 may adjust the number of pixels to render the second video using the first video 221. According to adjusting the number of pixels, the electronic device 101 may adjust resolution corresponding to the second video to be displayed by adjusting the projection assembly 230. However, it is not limited thereto.

According to an embodiment of the disclosure, the electronic device 101 may identify a time for generating the second video based on the size of the second video (e.g., the size 311 or the size 312) and/or the number of pixels included in the second video. When the number of pixels is set equally, a time for generating the second video based on the size 312 may be greater than a time for generating the second video based on the size 311. The electronic device 101 may adjust the time for generating the second video, by adjusting the size of the second video and/or the number of pixels included in the second video.

Referring to FIG. 3B, according to an embodiment of the disclosure, the electronic device 101 may identify an external electronic device (e.g., the external electronic device 102 of FIG. 2) and/or an external object 330 using a camera. The electronic device 101 may adjust a size of a second video (e.g., the second video 222 of FIG. 2) based on identifying the external object 330.

For example, the electronic device 101 may generate the second video extended from each of edges of the first video 221. The electronic device 101 may adjust a length extending from the edges of the first video 221, based on a position of the external object 330. For example, the electronic device 101 may identify the external object 330 adjacent to an edge of the second video. For example, when the electronic device 101 generates the second video based on the size 312, a length extended from a first edge 221-1 of the first video 221 to a first edge 312-1 of the second video 222 may be longer than a length extended from a second edge 221-2 of the first video 221 to a second edge 312-2 of the second video 222. The electronic device 101 may generate the second video 222 suitable for a space in which a user of the electronic device 101 is located, by adjusting the size of the second video 222 extended from the first video 221.

According to an embodiment of the disclosure, when displaying the second video 222, the electronic device 101 may adjust a displaying area (e.g., the displaying area 105 of FIG. 1) in which light of a projection assembly is to be projected, by using the projection assembly (e.g., the projection assembly 230 of FIG. 2). For example, in a state of generating the second video 222 based on the size 312 of FIG. 3A, the electronic device 101 may identify a position of the external object 330 to output the second video 222. The electronic device 101 may change an area of the second video 222 overlapping with the first video 221, based on identifying the position of the external object 330. The electronic device 101 may generate a black area corresponding to a position of an external electronic device (e.g., the external electronic device 102 of FIG. 2) on which the first video 221 is to be displayed. The electronic device 101 may use the black area to prevent part of the second video 222 from being displayed by overlapping the first video 221 on an external electronic device on which the first video 221 is to be displayed. For example, the electronic device 101 may include an actuator (not shown) for adjusting the displaying area to which light of the projection assembly is to be projected. The electronic device 101 may prevent the light from being projected onto the external object 330, based on adjusting the displaying area.

As described above, the electronic device 101 may adjust the size of the second video 222, by using information on a space obtained using the camera. The electronic device 101 may prevent distortion of the second video 222 by the external object 330, by adjusting the size of the second video 222. The electronic device 101 may prevent diffused reflection of light representing the second video 222 projected using the projection assembly by the external object 333, by adjusting the size of the second video 222.

Hereinafter, in FIG. 4, an example of an operation in which the electronic device 101 generates the second video 222 using the first video 221 will be described later.

Figure 4:
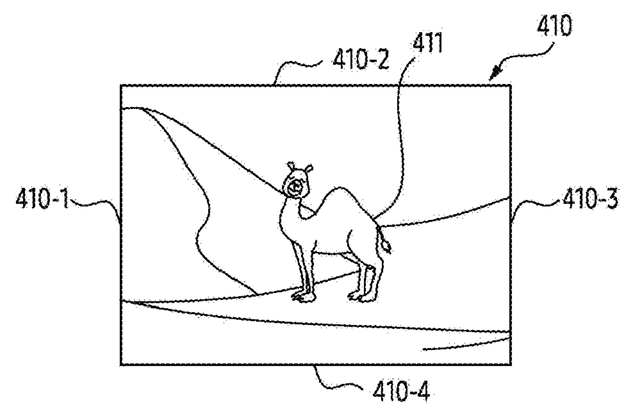
FIG. 4 illustrates an operation in which an electronic device generates a second video using a first video according to an embodiment of the disclosure.
Figure 4:
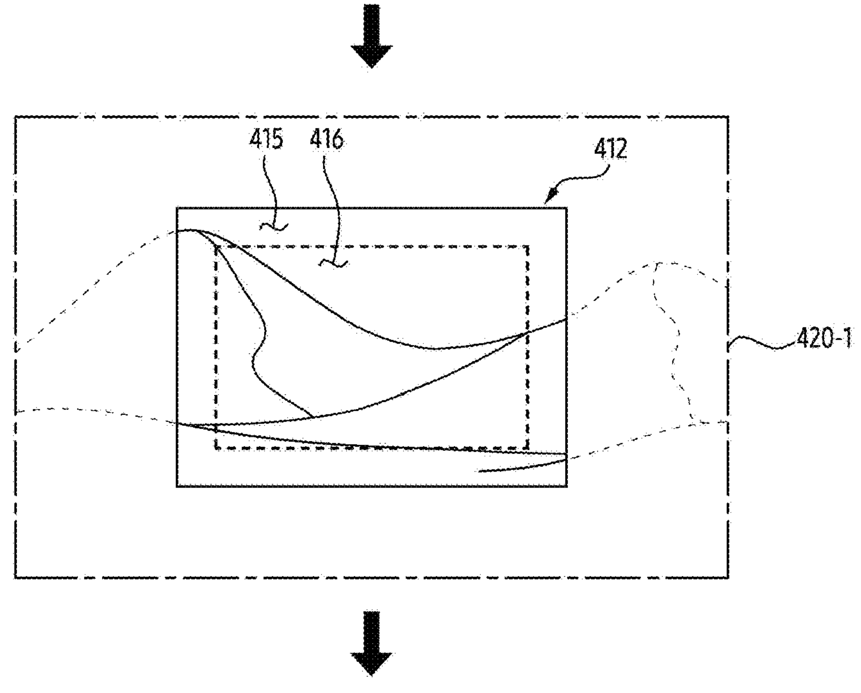
Figure 4:
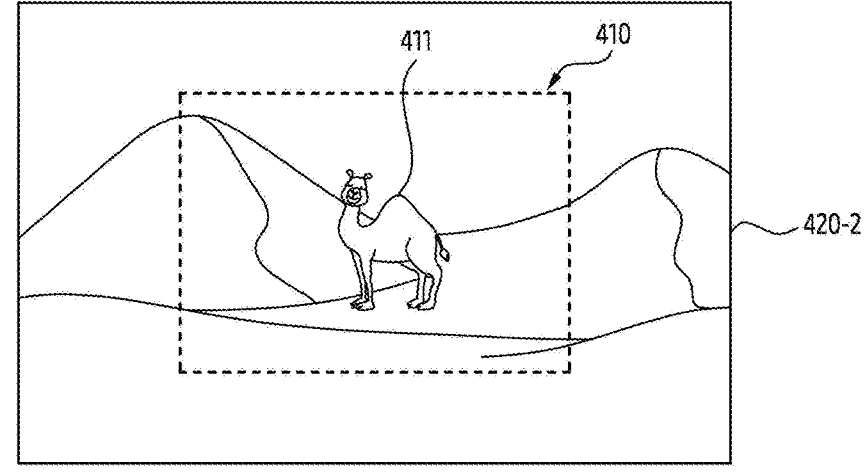

FIG. 4 illustrates an operation in which an electronic device generates a second video using a first video, according to an embodiment of the disclosure. The electronic device 101 of FIG. 4 may be an example of the electronic device 101 of FIGS. 1, 2, 3A and 3B.

Referring to FIG. 4, according to an embodiment of the disclosure, the electronic device 101 may obtain information on a first video 410 from an external electronic device (e.g., the external electronic device 102 of FIG. 1). For example, the electronic device 101 may use a video (e.g., the first video 221 of FIG. 2) stored in a memory (e.g., the memory 220 of FIG. 2).

According to an embodiment of the disclosure, the electronic device 101 may execute a scan from edges (e.g., at least one of edges 410-1, 410-2, 410-3, and 410-4) of each of a plurality of images in the first video 410 toward a center area of each of the plurality of images, based on execution of an image generation application (e.g., the image generation application 225 of FIG. 2). For example, the electronic device 101 may execute a scan from the center area toward the edge. However, it is not limited thereto. For example, the electronic device 101 may execute a scan from one edge toward the center area. For example, the electronic device 101 may scan the entire first video 410 substantially simultaneously. For example, the operation in which the electronic device 101 scans a plurality of images may include an operation of identifying at least one visual object from each of the plurality of images.

For example, based on executing the scan, the electronic device 101 may analyze each of the plurality of images of the first video 410. For example, the electronic device 101 may identify an object (e.g., a visual object 411) included in each of the plurality of images of the first video 410. The object included in each of the plurality of images may be referred to as the visual object 411, in terms of being included in the first video 410. The electronic device 101 may select or classify at least one image for generating a second video 420-2 from among the plurality of images of the first video 410, based on executing the scan.

According to an embodiment of the disclosure, the electronic device 101 may identify a motion of the visual object 411 included in the first video 410. The electronic device 101 may identify the motion by using each of the plurality of images of the first video 410. The electronic device 101 may identify the motion of the visual object 411, based on identifying motion blur using each of the plurality of images. However, it is not limited thereto. For example, the electronic device 101 may identify the motion of the visual object 411, based on identifying optical flow included in each of the plurality of images. For example, the electronic device 101 may identify the motion of the visual object 411, by using a plurality of frames, based on an identifier corresponding to the visual object 411.

For example, the electronic device 101 may identify the motion of the visual object 411 based on the identifier corresponding to the visual object 411, by using each of plurality of images. For example, the electronic device 101 may use each of plurality of images to distinguish between the visual object 411 and a visual object representing an external space, such as a background. The electronic device 101 may identify the motion of the visual object 411 while maintaining display of the visual object representing the external space, based on distinguishing between the visual object representing the external space and the visual object 411 using the plurality of images.

For example, the electronic device 101 may mask the visual object 411 based on identifying the motion of the visual object 411. For example, the electronic device 101 may obtain a masking area 416 for masking the visual object 411. Referring to FIG. 4, the masking area 416 is illustrated based on a rectangle, but is not limited thereto. The electronic device 101 may obtain a masking area 416 based on a shape of the visual object 411. For example, the electronic device 101 may remove the obtained masking area 416 from the first video 410. The electronic device 101 may perform inpainting to remove the masking area. Inpainting may mean changing data corresponding to the masking area 416 to data corresponding to a different area, by using the different area (e.g., the painting area 415) than the masking area 416. For example, the electronic device 101 may use a generative adversarial network (GAN) to perform inpainting.

According to an embodiment of the disclosure, the electronic device 101 may identify a size of a second video 420-1 extended from the first video 412 from which the visual object 411 is removed, based on masking the visual object 411. The electronic device 101 may identify the painting area 415 based on scanning each of a plurality of images of the first video 412. For example, the painting area 415 may include pixels based on similar color information. The painting area 415 may include pixels based on similar patterns. However, it is not limited thereto. For example, the painting area 415 may include visual objects representing background, such as natural environment, landscape, and/or crowd. For example, the electronic device 101 may obtain the second video 420-1 from the first video 412 including the painting area 415, based on identifying the painting area 415 including pixels based on similar color information.

According to an embodiment of the disclosure, the electronic device 101 may obtain the second video 420-1 extended from the first video 412 by using pixels and/or data included in the painting area 415. The electronic device 101 may obtain the second video 420-1 by performing out painting. The second video 420 may be obtained based on extending from each of edges (e.g., edges 410-1, 410-2, 410-3, and 410-4) of the first video 412. For example, the electronic device 101 may obtain a part of an extended area adjacent to the edge 410-1, by using the painting area 415 adjacent to the edge 410-1. The extended area may mean an area in which the electronic device 101 obtains by using pixels and/or data included in the painting area 415, based on the size of the second video 420-1. However, it is not limited thereto. The electronic device 101 may use a part of the painting area 415 adjacent to the edge 410-3 to obtain a part of the extended area adjacent to the edge 410-1. Based on symmetry, the electronic device 101 may obtain a part of the extended area by using a part of the painting areas 415 adjacent to the edge 410-3.

According to an embodiment of the disclosure, the electronic device 101 may adjust a shape of the second video 420-1, based on generating the second video 420-1 extended from the first video 412. For example, the electronic device 101 may change the shape of the second video 420-1 based on an aspect ratio of the first video 410. For example, the electronic device 101 may restore corrupted data in the second video 420-1 to change the shape of the second video 420-1, by performing inpainting and/or out-painting. The second video 420-1 in which the shape is changed may be substantially similar to a shape (e.g., a square) of the first video 412. For example, changing the shape of the second video 420-1 may include resizing the size of the second video 420-1.

According to an embodiment of the disclosure, the electronic device 101 may obtain the second video 420-2 including the visual object 411 by using the second video 420-1. The electronic device 101 may identify the second video 420-1 extended from the first video 412 in which the visual object 411 is removed, and not including the visual object 411. The electronic device 101 may obtain the second video 420-2 by including the visual object 411 in the second video 420-1. For example, the electronic device 101 may obtain the second video 420-2 by rendering the visual object 411 and the second video 420-1. For example, the electronic device 101 may obtain the second video 420-2 based on synthesizing the visual object 411 and the second video 420-1. The second video 420-2 may include the first video 410. The second video 420-2 may be referred to the second video 222 of FIG. 2.

According to an embodiment of the disclosure, the electronic device 101 may identify a time for generating the second video 420-2, by using the first video 410. The electronic device 101 may identify a time to be spent to obtain information for displaying the second video 420-2 extended from the first video 410. The electronic device 101 may identify the time based on a size of the second video 420-2 and/or the number of pixels included in the second video 420-2. The electronic device 101 may provide a user with a notification for informing the time.

As described above, according to an embodiment of the disclosure, the electronic device 101 may select at least one of a plurality of images included in the first video 410 to obtain the extended second video 420-2 from the first video 410. The selected at least one may mean an image suitable for performing inpainting and/or out-painting. Pixels included in the selected at least one may include similar color information. The electronic device 101 may identify a time to obtain the second video 420-2. By providing the time to the user, the electronic device 101 may inform a time for displaying a video (e.g., the first video 410 and the second video 420-2) together with an external electronic device (e.g., the external electronic device 102 of FIG. 1).

Figure 5:
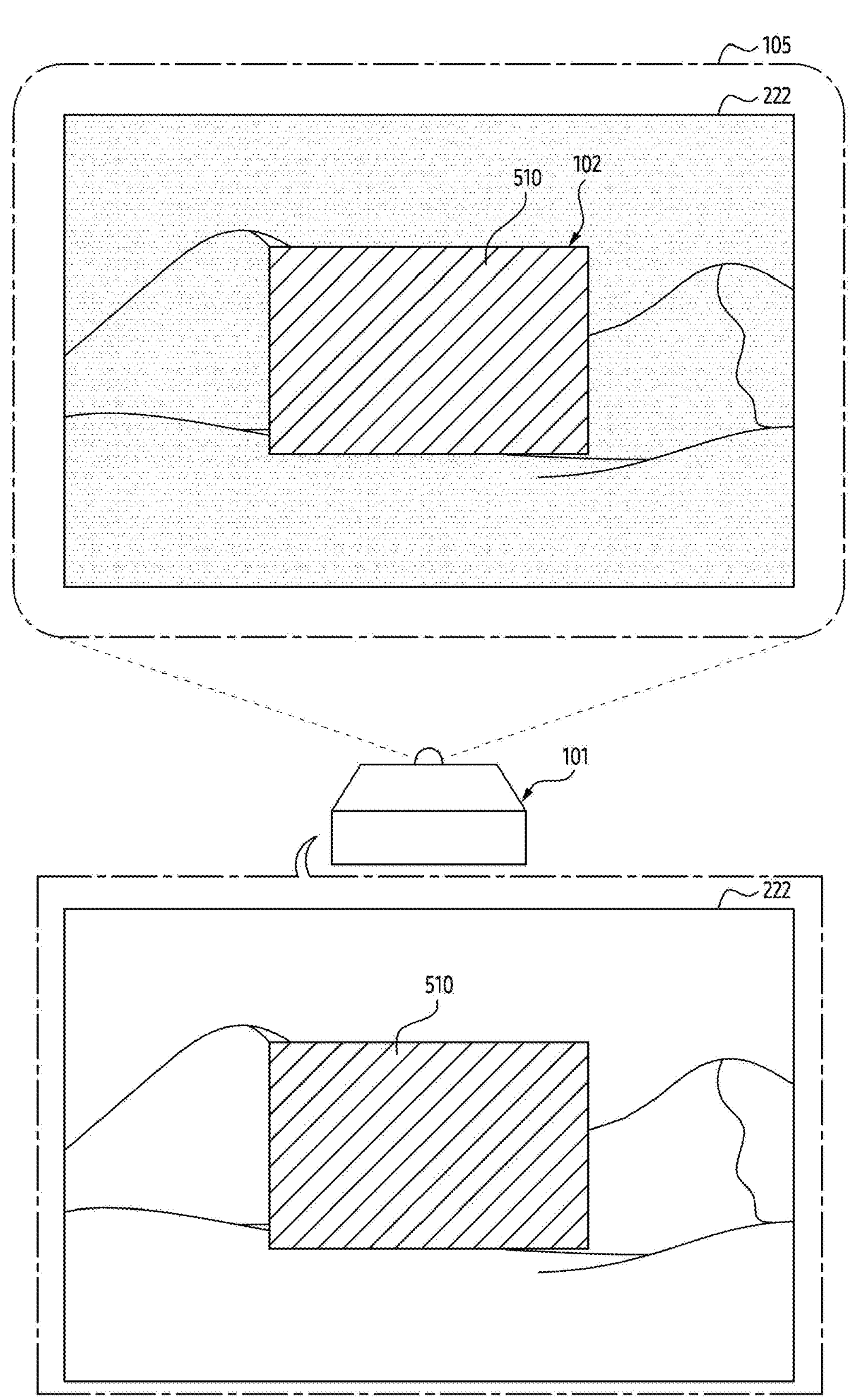
FIG. 5 illustrates an operation in which an electronic device identifies a shape of an external electronic device to display a second video according to an embodiment of the disclosure.

FIG. 5 illustrates an operation in which an electronic device identifies a shape of an external electronic device to display a second video, according to an embodiment of the disclosure. The electronic device 101 of FIG. 5 may be an example of the electronic device 101 of FIGS. 1, 2, 3A, 3B, and 4.

Referring to FIG. 5, according to an embodiment of the disclosure, a state in which the electronic device 101 identifies a shape of the external electronic device 102 in order to display the second video 222 using a camera (e.g., the camera 240 of FIG. 2) is illustrated.

According to an embodiment of the disclosure, the electronic device 101 may initiate driving the camera in response to an input indicating to play the second video 222. For example, the electronic device 101 may identify a shape of external electronic device 102 using a camera. The electronic device 101 may identify a position of the external electronic device 102 disposed in a displaying area 105 using the camera. The electronic device 101 may obtain the second video 222 including a black area 510, based on the shape of the external electronic device 102 and/or the position. For example, the electronic device 101 may block light representing the second video 222 from being projected onto the external electronic device 102 using the black area 510, by controlling the projection assembly. However, it is not limited thereto.

For example, the electronic device 101 may prevent a part of the second video 222 from being displayed on the external electronic device 102, by overlapping the second video 222 and displaying at least one layer on the black area 510. The at least one layer may be generated based on a designated color (e.g., black).

For example, the electronic device 101 may adjust an alpha value (e.g., a parameter indicating transparency) of the black area 510, within the second video 222. The electronic device 101 may adjust size, color, and/or alpha value of the black area 510 based on a position and/or number of the external electronic device 102.

According to an embodiment of the disclosure, when a position and/or direction of the displaying area 105 is changed, the electronic device 101 may change the position of the black area 510 in the second video 222 by controlling the projection assembly based on identifying the external object 330 of FIG. 3B. The changed position of the black area 510 may correspond to the position of the external electronic device 102 in the changed displaying area 105. For example, the position of the black area 510 in the second video 222 may include an area corresponding to the first video 410 in the second video 420-2 of FIG. 4.

As described above, according to an embodiment of the disclosure, the electronic device 101 may obtain the second video 222 including the black area 510, based on the position of the external electronic device 102 identified using a camera. For example, when the electronic device 101 projects the second video 222 not including the black area 510 by using the projection assembly, a part of the second video 222 may be displayed on the external electronic device 102 positioned in the displaying area 105. When the part of the second video 222 is displayed on the external electronic device 102, the part of the second video 222 may overlap a first video (e.g., the first video 115 of FIG. 1) displayed by the external electronic device 102. The electronic device 101 may prevent or reduce the part of the second video 222 and the first video from overlapping, by using the black area 510.

Figure 6:
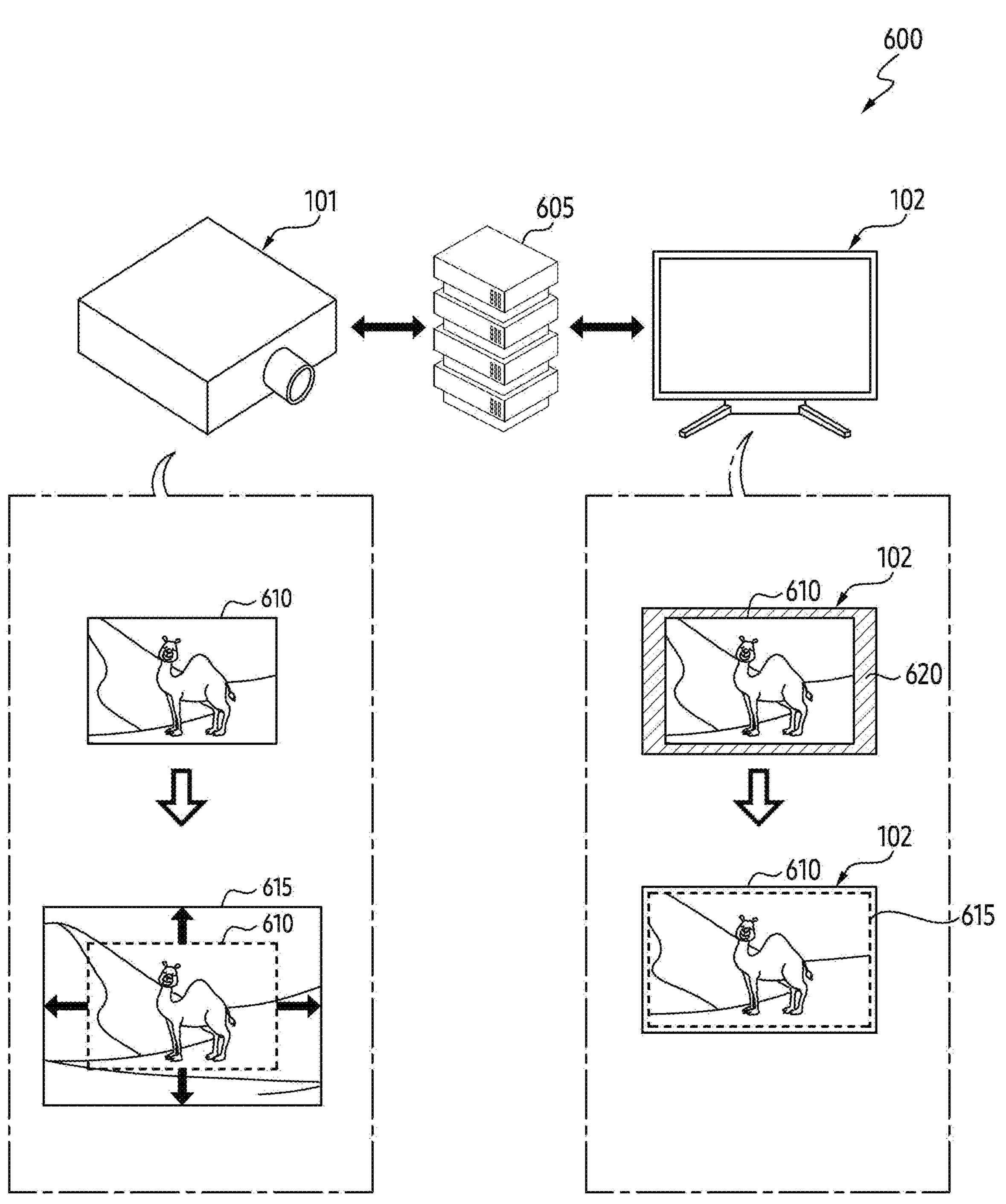
FIG. 6 illustrates an operation in which an electronic device transmits information for a second video to a server according to an embodiment of the disclosure.

FIG. 6 illustrates an operation in which an electronic device transmits information for a second video to a server according to an embodiment of the disclosure. The electronic device 101 of FIG. 6 may be an example of the electronic device 101 of FIGS. 1, 2, 3A, 3B, 4, and 5. The external electronic device 102 of FIG. 6 may be an example of the external electronic device 102 of FIG. 1.

Referring to FIG. 6, a state 600 representing an example of a network environment between an electronic device 101, a server 605, and/or an external electronic device 102 is illustrated. The number and/or type of the external electronic device 102 are not limited to those illustrated in FIG. 6. For example, the external electronic device may include a TV, a notebook, a PC, a tablet PC, and/or a smartphone.

According to an embodiment of the disclosure, the electronic device 101 may transmit information on the second video (e.g., the second video 222 of FIG. 2) to the server 605 through a communication circuit in the state 600. For example, information on the second video may be represented as metadata including information on a first video (e.g., the first video 221 of FIG. 2) corresponding to the second video, a size of the second video, the number (or quality) of pixels included in the second video, data corresponding to the second video, a running time of the second video, resolution corresponding to the second video, and/or a codec available to play the second video.

According to an embodiment of the disclosure, the electronic device 101 may request information on the second video corresponding to the first video to the server 605, in response to an input indicating to play the first video (e.g., the first video 115 of FIG. 1) from the external electronic device 102. The server 605 may transmit information on the second video to the electronic device 101. Based on receiving information on the second video from the server 605, the electronic device 101 may display the second video corresponding to the first video in conjunction with the external electronic device 102 by controlling the projection assembly, in response to the input. The second video may be an example of a video uploaded to the server 605 by another electronic device different from the electronic device 101.

According to an embodiment of the disclosure, the electronic device 101 may receive information on a first video 610 from the server 605 and/or the external electronic device 102 using a communication circuit.

For example, an aspect ratio of the first video 610 may be different from an aspect ratio of a display (e.g., the display 260 of FIG. 2) of the external electronic device 102. When the external electronic device 102 displays the first video 610 on the display, the external electronic device 102 may display the first video 610 and a filler box 620 on the display based on the aspect ratio of the display. The filler box 620 may mean a black area used by the external electronic device 102 to display the first video 610 on the display based on the aspect ratio of the display different from the aspect ratio of the first video 610.

For example, the electronic device 101 may generate a second video 615 corresponding to the aspect ratio of the display of the external electronic device 102 using the first video 610. An operation in which the electronic device 101 generates the second video 615 using the first video 610 may be substantially similar to an operation in which the electronic device 101 generates the second video 420-2 using the first video 410 in FIG. 4.

According to an embodiment of the disclosure, the electronic device 101 may transmit information indicating the second video 615 to the server 605 and/or the external electronic device 102 using the communication circuit.

For example, the external electronic device 102 may display the second video 615 on the display, based on receiving the second video 615 from the server 605 and/or the electronic device 101. An aspect ratio of the second video 615 may be the same as the aspect ratio of the display of the external electronic device 102. The second video 615 may include information on the first video 610.

As described above, according to an embodiment of the disclosure, the electronic device 101 may upload the second video 615 extended from the first video 610 to the server 605 using the communication circuit. For example, the electronic device 101 may receive information on at least one video from the server 605. For example, the electronic device 101 may request information on the second video from the server 605, in response to an input indicating to play the first video, independently of an operation of generating the second video corresponding to the first video. The electronic device 101 may reduce time for generating the second video by using the server 605. For example, the electronic device 101 may identify the first video based on an aspect ratio different from the external electronic device 102. The electronic device 101 may transmit the second video based on the aspect ratio of the external electronic device 102 to the external electronic device 102, by generating the extended second video from the first video. The electronic device 101 may provide a video from which the filler box 620 is removed to the user by generating the second video.

Figure 7:
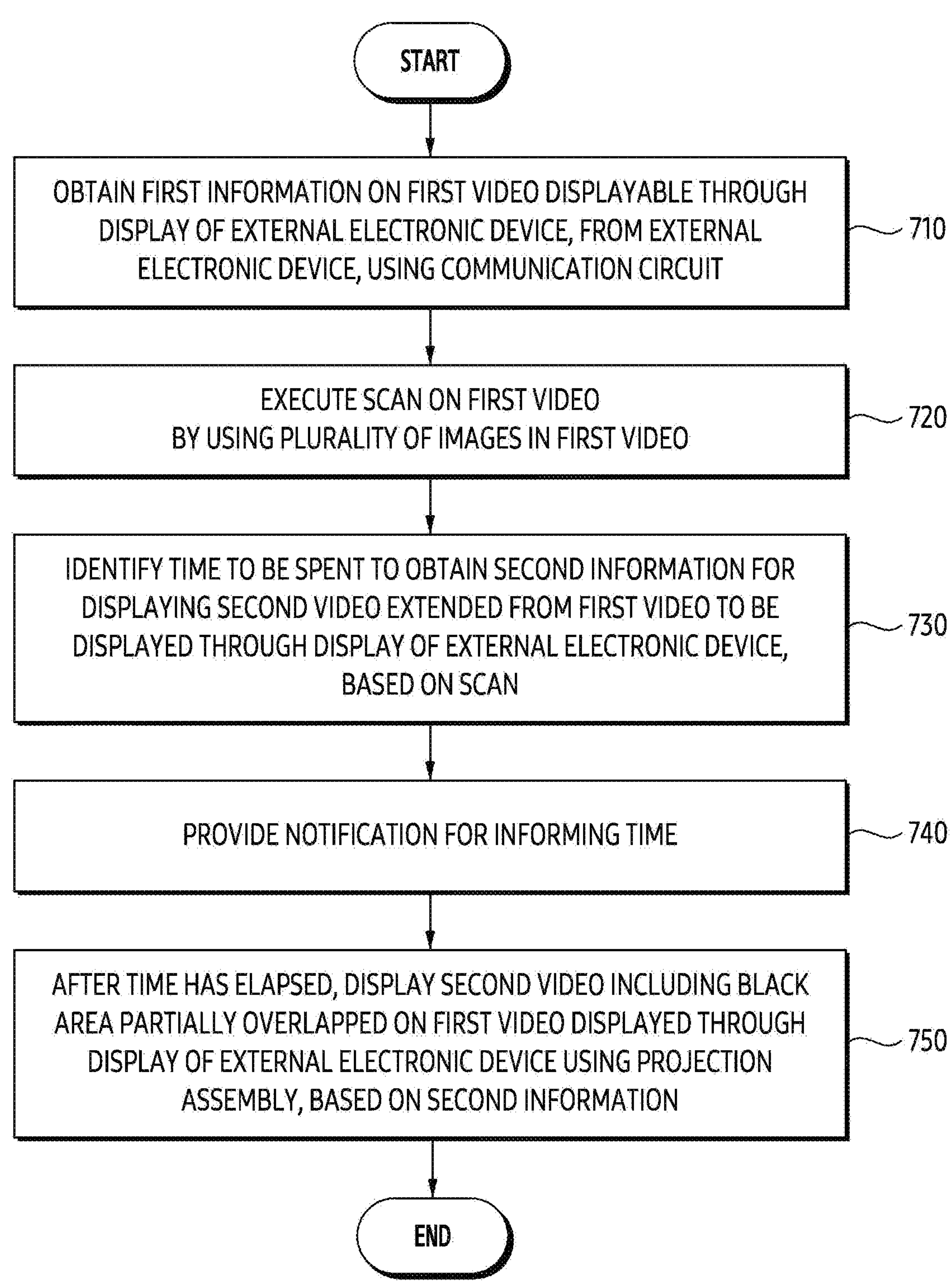
FIG. 7 illustrates a flowchart illustrating an operation of an electronic device according to an embodiment of the disclosure.

FIG. 7 illustrates a flowchart illustrating an operation of an electronic device according to an embodiment. The electronic device 101 of FIG. 7 may include the electronic device 101 of FIGS. 1, 2, 3A, 3B, and 4 to 6. At least one of operations of FIG. 7 may be performed by the electronic device 101 of FIG. 2 and/or the processor 210 of FIG. 2. Each operations of FIG. 7 may be performed sequentially, but is not necessarily performed sequentially. For example, the sequence of each operation may be changed, and at least two operations may be performed in parallel.

Referring to FIG. 7, according to an embodiment of the disclosure, in operation 710, the electronic device may obtain first information on a first video displayable through a display of an external electronic device from the external electronic device using a communication circuit. For example, the electronic device may obtain information on the first video (e.g., the first video 221-1 of FIG. 2) from the external electronic device (e.g., the external electronic device 102 of FIG. 2) using a communication circuit (e.g., the communication circuit 250 of FIG. 2). The first video (e.g., the first video 221 of FIG. 2) stored in the electronic device and the first video (e.g., the first video 221-1 of FIG. 2) stored in the external electronic device may include substantially the same information based on the communication circuit.

Referring to FIG. 7, according to an embodiment of the disclosure, in operation 720, the electronic device may execute a scan on the first video by using a plurality of images in the first video. The electronic device may execute the scan from an edge area of each of the plurality of images in the first video toward the center area of each of the plurality of images. The electronic device 101 may execute the scan for identifying at least one visual object using the plurality of images in the first video. The electronic device 101 may execute the scan to identify an area to be extended from the first video to the second video, by using the plurality of images. The area to be expanded may include the painting area 415 of FIG. 4. For example, the electronic device may identify pixels included in each of the plurality of images of the first video based on executing the scan. The electronic device may distinguish at least one image for generating the second video from among the plurality of images, based on identifying pixels.

Referring to FIG. 7, according to an embodiment of the disclosure, in operation 730, the electronic device may identify a time to be spent to obtain second information for displaying the second video extended from the first video to be displayed through a display of the external electronic device, based on the scan. The electronic device may identify the time based on a size of the second video and/or the number of pixels included in the second video. The electronic device may adjust the size of the second video and/or the number of pixels based on setting a time.

For example, the electronic device may adjust the size of the second video based on a size of a plane to display the second video, by using a camera (e.g., the camera 240 of FIG. 2). The electronic device may adjust the size of the second video based on identifying an external object (e.g., the external object 330 of FIG. 3B) adjacent to the plane using the camera.

Referring to FIG. 7, according to an embodiment of the disclosure, in operation 740, the electronic device may provide a notification for informing a time. The electronic device may transmit a signal indicating the notification to an external electronic device using a communication circuit. The electronic device may display a screen indicating the notification by controlling a projection assembly. The electronic device may output an audio signal indicating the notification using a speaker. The electronic device may transmit a signal indicating the notification to another external electronic device (e.g., a smartphone) different from the external electronic device. However, it is not limited thereto.

Referring to FIG. 7, according to an embodiment of the disclosure, in operation 750, after the time has elapsed, the electronic device may display the second video including a black area partially overlapped on the first video displayed through the display of the external electronic device using the projection assembly, based on the second information. For example, the electronic device may display the second video in response to an input indicating to play the second video (e.g., the second video 222 of FIG. 2) after the time has elapsed.

For example, the electronic device may identify a position of the external electronic device and/or a shape of the external electronic device, by using the camera. The electronic device may obtain a black area (e.g., the black area 510 of FIG. 5) corresponding to the position of the external electronic device and/or the shape of the external electronic device. The electronic device may project light indicating the second video including the black area toward a plane adjacent to the external electronic device 102, by controlling the projection assembly. The electronic device may display the second video synchronized with the first video using the communication circuit, while the external electronic device displays the first video.

Figure 8:
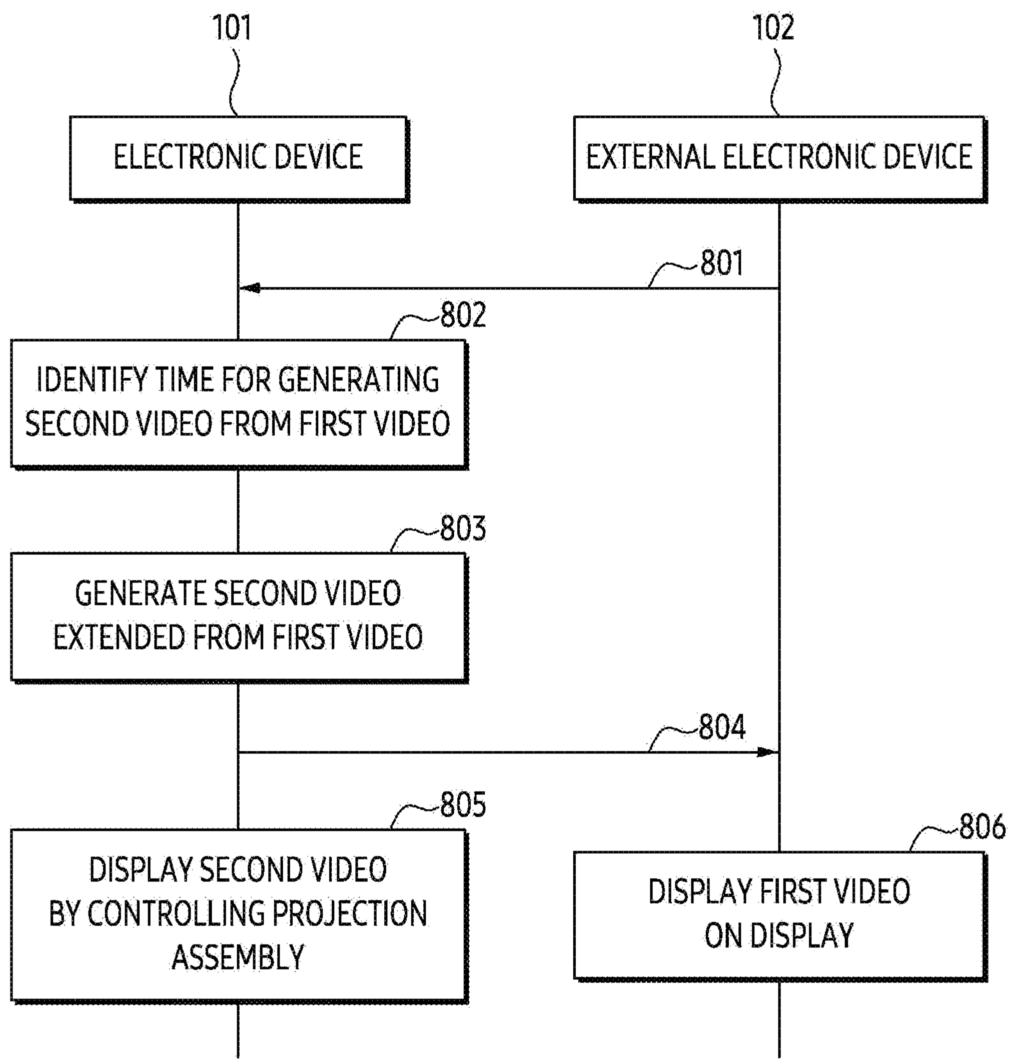
FIG. 8 is a signal flowchart illustrating a signal transmitted and received between an electronic device and an external electronic device according to an embodiment of the disclosure.

FIG. 8 is a signal flowchart illustrating a signal transmitted and received between an electronic device and an external electronic device, according to an embodiment of the disclosure. The electronic device 101 of FIG. 8 may include the electronic device 101 of FIGS. 1, 2, 3A, 3B, and 4 to 7. The external electronic device 102 of FIG. 8 may include the external electronic device 102 of FIGS. 1, 2, 3A, 3B, and 4 to 7.

Referring to FIG. 8, according to an embodiment of the disclosure, the electronic device 101 may receive a signal 801 for a first video (e.g., the first video 115 of FIG. 1) from the external electronic device 102 in a state that a communication link is established using a communication circuit and the external electronic device 102. For example, the electronic device 101 may receive an input indicating to play the first video 221 stored in a memory.

Referring to FIG. 8, according to an embodiment of the disclosure, in operation 802, the electronic device 101 may identify a time for generating a second video (e.g., the second video 222 of FIG. 2) from the first video. The time may be different according to a size of the second video and/or quality of the second video. The electronic device 101 may provide the time to a user.

Referring to FIG. 8, according to an embodiment of the disclosure, in operation 803, the electronic device 101 may generate the second video extended from the first video. The second video may be generated based on a size exceeding a size of the first video. For example, an aspect ratio of the second video may be different from an aspect ratio of the first video. The electronic device 101 may analyze each of a plurality of images of the first video in order to generate the second video. For example, the electronic device 101 may request information on the second video from a server (e.g., the server 605 of FIG. 6).

For example, the electronic device 101 may identify an external object adjacent to a plane on which the second video is to be displayed, by using a camera, in order to generate the second video. The electronic device 101 may adjust the size of the second video based on the identification of the external object. However, it is not limited thereto.

Referring to FIG. 8, according to an embodiment of the disclosure, the electronic device 101 may transmit a signal 804 indicating to play the second video to the external electronic device 102. For example, the electronic device 101 may upload information indicating the second video to a server (e.g., the server 605 of FIG. 6), independently of transmitting the signal 804.

For example, the electronic device 101 may provide a user with a notification indicating that the generation of the second video is completed after the time for generating the second video has elapsed. For example, the electronic device 101 may transmit the signal 804, in response to an input indicating to play the second video from the user. However, it is not limited thereto. For example, a signal indicating to play the first video corresponding to the second video may be received from the external electronic device 102.

Referring to FIG. 8, according to an embodiment of the disclosure, in operation 805, the electronic device 101 may display the second video by controlling the projection assembly based on transmitting the signal 804. The electronic device 101 may display a second video including a black area (e.g., the black area 510 of FIG. 5). A position and/or shape of the black area in the second video may be changed based on a position and/or shape of the external electronic device.

Referring to FIG. 8, according to an embodiment of the disclosure, in operation 806, the external electronic device 102 may display the first video on the display, based on receiving the signal 804. Based on the communication link, displaying the first video on the display by the external electronic device 102 may be performed substantially simultaneously with displaying the second video by the electronic device 101.

Figure 9:
FIG. 9 is a diagram of a network environment related to a metaverse service according to an embodiment of the disclosure.
Figure 9:
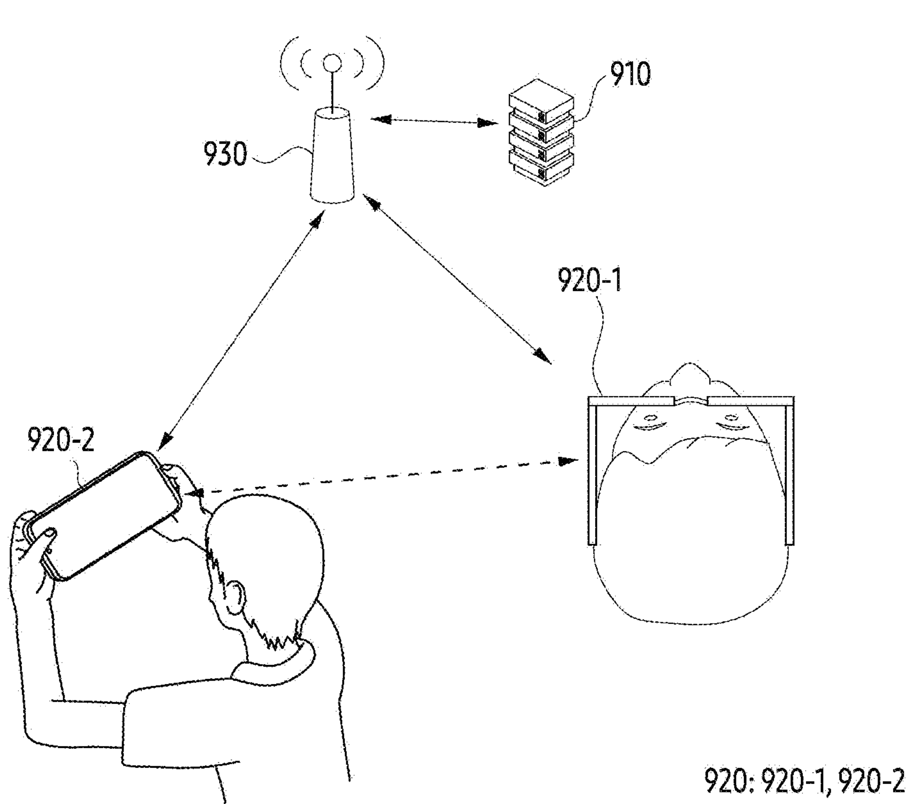

FIG. 9 is a diagram of a network environment related to a metaverse service according to an embodiment of the disclosure.

Metaverse is a combination of the English words Meta, which means "virtual" and "transcendence," and "Universe," which means the universe, and refers to a three-dimensional virtual world where social, economic, and cultural activities like the real world take place. Metaverse is a concept that has evolved one step further than virtual reality, and it is characterized by using avatars to not only enjoy games or virtual reality (VR), (cutting-edge technology that enables people to experience real-life experiences in a computerized virtual world) but also social and cultural activities like real reality. Metaverse service may provide media content for enhancing immersion in the virtual world, based on augmented reality (AR), virtual reality environment (VR), mixed environment (MR) and/or extended reality (XR).

For example, media content provided by the metaverse service may include social interaction content including a game, a concert, a party, and/or meeting based on avatar. For example, the media content may include advertisements, user created content, and/or information for economic activities, such as selling of productions and/or shopping. Ownership of the user created content may be proven by a non-fungible token (NFT) based on blockchain. Metaverse services may support economic activities based on real money and/or cryptocurrency. Virtual content linked to the real world, such as digital twin or life logging, may be provided by the metaverse service.

FIG. 9 is a diagram of a network environment in which a metaverse service is provided through a server according to an embodiment of the disclosure.

Referring to FIG. 9, a network environment 901 may include a server 910, a user terminal 920 (e.g., a first terminal 920-1 and a second terminal 920-2), and a network connecting the server 910 and the user terminal 920. In the network environment 901, the server 910 may provide a metaverse service to the user terminal 920. The network may be formed by at least one intermediate node 930 including an access point (AP) and/or a base station. The user terminal 920 may output a user interface (UI) related to the metaverse service to the user of the user terminal 920, by accessing to the server 910 through the network. Based on the UI, the user terminal 920 may obtain information to be inputted to the metaverse service from the user or output information (e.g., multimedia content) related to the metaverse service to the user.

In this case, the server 910 provides a virtual space so that the user terminal 920 may perform an activity in a virtual space. In addition, by installing an S/W agent to access the virtual space provided by the server 910, the user terminal 920 may represent information provided by the server 910 to the user or transmit information in which the user wants to represent in the virtual space to the server. The S/W agent may be provided directly through the server 910, downloaded from a public server, or embedded when purchasing the terminal.

In an embodiment of the disclosure, the metaverse service may be provided to the user terminal 920 and/or the user by using the server 910. The embodiment is not limited thereto, and the metaverse service may be provided through an individual contact between users. For example, in a network environment 901, the metaverse service may be provided by a direct connection between the first terminal 920-1 and the second terminal 920-2, independently of the server 910. Referring to FIG. 9, in the network environment 901, the first terminal 920-1 and the second terminal 920-2 may be connected to each other through a network formed by at least one intermediate node 930. In an embodiment in which the first terminal 920-1 and the second terminal 920-2 are directly connected, any one of the first terminal 920-1 and the second terminal 920-2 may serve as the server 910. For example, a metaverse environment may be formed with only a connection (e.g., a peer-to-peer (P2P) connection) between device to device.

In an embodiment of the disclosure, the user terminal 920 (or the user terminal 920 including the first terminal 920-1 and the second terminal 920-2) may be made of various form factors, and may include an output device for providing an image or/and sound to a user and an input device for inputting information to the metaverse service. Examples of various form factors of the user terminal 920 may include a smartphone (e.g., the second terminal 920-2), an AR device (e.g., the first terminal 920-1), a VR device, an MR device, a video see through (VST) device, an optical see through (OST) device, a smart lens, a smart mirror, a TV with input/output capability, or a projector.

A network (e.g., a network formed by at least one intermediate node 930) of the disclosure includes both various broadband networks including third generation (3G), fourth generation (4G), and 5G, and a short-range network (e.g., a wired network or a wireless network that directly connects the first terminal 920-1 and the second terminal 920-2) including Wi-fi, BT, and the like.

According to an embodiment of the disclosure, in a state of establishing a communication link with the external electronic device, the electronic device may display another video corresponding to a video displayed on the display of the external electronic device by controlling the projection assembly. A method for the electronic device to generate the other video corresponding to the video displayed on the display of the external electronic device may be required.

As described above, according to an embodiment of the disclosure, an electronic device 101 may comprise a communication circuit 250, a projection assembly 230, a processor 210, and a memory 220 storing instructions. The instructions, when executed by the processor, cause the electronic device to obtain first information for a first video 115, 221, 410; 610 displayable through a display 260 of an external electronic device 102, from the external electronic device using the communication circuit. The instructions, when executed by the processor, cause the electronic device to execute a scan on the first video using a plurality of images in the first video. The instructions, when executed by the processor, cause the electronic device to identify a time to be spent to obtain second information for displaying a second video 110, 222, 420-2, 615 expanded from the first video to be displayed through the display of the external electronic device, based on the scan. The instructions, when executed by the processor, cause the electronic device to provide a notification for informing the time. The instructions, when executed by the processor, cause the electronic device to, after the time has elapsed, display the second video including a black area 510 partially overlapping the first video displayed through the display of the external electronic device, based on the second information, using the projection assembly.

For example, the instructions, when executed by the processor, cause the electronic device to identify the time based on at least one among a size of the second video and the number of pixels included in the second video.

For example, the instructions, when executed by the processor, cause the electronic device to obtain the painting area 415 of each of the plurality of images for generating the second video based on executing the scan. The processor may be configured to generate the second video using a plurality of pixels included in the painting area.

For example, the instructions, when executed by the processor, cause the electronic device to identify motion of an object 411 included in each of the plurality of images. The processor may be configured to obtain a masking area 416 for masking the object, based on the identified motion. The processor may be configured to generate the second video using the masking area.

For example, the instructions, when executed by the processor, cause the electronic device to display the second video synchronized with the first video displayed through the display of the external electronic device using the communication circuit, controlling the projection assembly.

For example, the electronic device 101 may comprise a camera 240. The processor may be configured to identify an external object 330 located in a space to be displayed the second video, using the camera, the instructions, when executed by the processor, cause the electronic device to adjust a size of the second vided, based on identifying the external object.

For example, the instructions, when executed by the processor, cause the electronic device to obtain the black area, based on a shape of the external electronic device identified using the camera.

For example, the external electronic device may be a first external electronic device, the instructions, when executed by the processor, cause the electronic device to transmit third information for the second video, to a second external electronic device 605 different from the first external electronic device, using the communications circuit.

As described above, according to an embodiment of the disclosure, a method of an electronic device 101 may comprise obtaining first information for a first video 115, 221, 410; 610 displayable through a display 260 of an external electronic device 102, from the external electronic device using a communication circuit. The method may comprise executing a scan on the first video using a plurality of images in the first video. The method may comprise identifying a time to be spent to obtain second information for displaying a second video 110, 222, 420-2, 615 expanded from the first video to be displayed through the display of the external electronic device, based on the scan. The method may comprise providing a notification for informing the time. The method may comprise, after the time has elapsed, displaying the second video including a black area 510 partially overlapping the first video displayed through the display of the external electronic device, based on the second information, using a projection assembly 230.

For example, the identifying the time may comprise identifying the time based on at least one among a size of the second video and the number of pixels included in the second video.

For example, the executing the scan may comprise obtaining the painting area 415 of each of the plurality of images for generating the second video based on executing the scan. The executing the scan may comprise generating the second video using a plurality of pixels included in the painting area.

For example, the executing the scan may comprise identifying motion of an object 411 included in each of the plurality of images. The executing the scan may comprise obtaining a masking area 416 for masking the object, based on the identified motion. The executing the scan may comprise generating the second video using the masking area.

For example, the displaying the second video may comprise displaying the second video synchronized with the first video displayed through the display of the external electronic device using the communication circuit, controlling the projection assembly.

For example, the displaying the second video may comprise identifying an external object 330 located in a space to be displayed the second video, using a camera 240. The displaying the second video may comprise adjusting a size of the second vided, based on identifying the external object.

For example, the displaying the second video may comprise obtaining the black area, based on a shape of the external electronic device identified using the camera.

For example, the external electronic device may be the first external electronic device. The displaying the second video may comprise transmitting third information for the second video, to a second external electronic device different from the first external electronic device, using the communications circuit.

As described above, according to an embodiment of the disclosure, a non-transitory computer readable storage medium storing one or more programs including instructions, the instructions, when executed by a processor 210 of an electronic device 101, cause the electronic device to obtain first information 115, 221, 410, 610 for a first video displayable through a display 260 of an external electronic device 102, from the external electronic device using a communication circuit. The instructions, when executed by the processor of the electronic device, cause the electronic device to execute a scan on the first video using a plurality of images in the first video. The instructions, when executed by the processor of the electronic device, cause the electronic device to identify a time to be spent to obtain second information for displaying a second video 110, 222, 420-2, 615 expanded from the first video to be displayed through the display of the external electronic device, based on the scan. The instructions, when executed by the processor of the electronic device, cause the electronic device to provide a notification for informing the time. The instructions, when executed by the processor of the electronic device, cause the electronic device to, after the time has elapsed, display the second video including a black area 510 partially overlapping the first video displayed through the display of the external electronic device, based on the second information, using a projection assembly 230.

For example, the instructions, when executed by the processor of the electronic device, cause the electronic device to identify the time based on at least one among a size of the second video and the number of pixels included in the second video.

For example, the instructions, when executed by the processor of the electronic device, cause the electronic device to obtain the painting area 415 of each of the plurality of images for generating the second video based on executing the scan. The instructions, when executed by the processor of the electronic device, cause the electronic device to generate the second video using a plurality of pixels included in the painting area.

For example, the instructions, when executed by the processor of the electronic device, cause the electronic device to identify motion of an object 411 included in each of the plurality of images. The instructions, when executed by the processor of the electronic device, cause the electronic device to obtain a masking area 416 for masking the object, based on the identified motion. The instructions, when executed by the processor of the electronic device, cause the electronic device to generate the second video using the masking area.

The device described above may be implemented as a combination of hardware components, software components, and/or hardware components and software components. For example, the devices and components described in the embodiments may be implemented using one or more general purpose computers or special purpose computers, such as processors, controllers, arithmetical logic unit (ALU), digital signal processor, microcomputers, field programmable gate array (FPGA), programmable logic unit (PLU), microprocessor, any other device capable of executing and responding to instructions. The processing device may perform an operating system OS and one or more software applications performed on the operating system. In addition, the processing device may access, store, manipulate, process, and generate data in response to execution of the software. For convenience of understanding, although one processing device may be described as being used, a person skilled in the art may see that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, code, instruction, or a combination of one or more of them and configure the processing device to operate as desired or command the processing device independently or in combination. Software and/or data may be embodied in any type of machine, component, physical device, computer storage medium, or device to be interpreted by a processing device or to provide instructions or data to the processing device. The software may be distributed on a networked computer system and stored or executed in a distributed manner. Software and data may be stored in one or more computer-readable recording media.

The method according to the embodiment may be implemented in the form of program instructions that may be performed through various computer means and recorded in a computer-readable medium. In this case, the medium may continuously store a computer-executable program or temporarily store the program for execution or download. In addition, the medium may be a variety of recording means or storage means in which a single or several hardware are combined and is not limited to media directly connected to any computer system and may be distributed on the network. Examples of media may include magnetic media, such as hard disks, floppy disks and magnetic tapes, optical recording media, such as compact disc read only memories (CD-ROMs) and digital versatile discs (DVDs), magneto-optical media, such as floptical disks, ROMs, RAMs, flash memories, and the like to store program instructions. Examples of other media include app stores that distribute applications, sites that supply or distribute various software, and recording media or storage media managed by servers.

Although embodiments have been described according to limited embodiments and drawings as above, various modifications and modifications are possible from the above description to those of ordinary skill in the art. For example, even if the described techniques are performed in a different order from the described method, and/or components, such as the described system, structure, device, circuit, and the like are combined or combined in a different form from the described method or are substituted or substituted by other components or equivalents, appropriate results may be achieved.

While the disclosure has been shown and described with reference to various embodiments thereof, it will be understood by those skilled in the art that various changes in form and details may be made therein without departing from the scope of the disclosure as defined by the appended claims and their equivalents.

What is claimed is:

1. An electronic device comprising:
communication circuitry;
a projection assembly;
at least one processor comprising processing circuitry; and
memory comprising one or more storage mediums storing instructions,
wherein the instructions, when executed by the at least one processor individually or collectively, cause the electronic device to:
obtain, from an external electronic device using the communication circuitry, first information for displaying a video to be played through a display of the external electronic device,
identify, based on the first information, at least one part of the video expandable by out-painting frames included in the at least one part of the video,
identify a remaining time to a time at which the frames included in the at least one part of the video are played through the display, the remaining time being a time for the electronic device to out-paint the frames included in the at least one part of the video,
determine, based on the remaining time, a size of expanded frames to be out-painted from the frames included in the at least one part,
generate, during the remaining time, the expanded frames by out-painting the frames, and
display, using the projection assembly, the expanded frames including a black area partially overlapping the video displayed through the display of the external electronic device, at a time when the at least one part including the frames is displayed.

2. The electronic device of claim 1, wherein the instructions, when executed by the at least one processor individually or collectively, further cause the electronic device to:
determine, based on the remaining time, quality of the expanded frames to be out-painted from the frames included in the at least one part.

3. The electronic device of claim 2,
wherein the quality of the expanded frames includes resolution, a frame rate, brightness, color, and/or bitrate.

4. The electronic device of claim 1,
wherein the instructions, when executed by the at least one processor individually or collectively, further cause the electronic device to:
transmit, using the communications circuitry, information on the expanded frames to a server, and
wherein the information on the expanded frames is used for another electronic device including another projection assembly to display the expanded frames, during the video being displayed, without generating other expanded frames.

5. The electronic device of claim 1, wherein the at least one part of the video depicts a natural environment, landscape, and/or crowd as a background.

6. The electronic device of claim 1, wherein the instructions, when executed by the at least one processor individually or collectively, further cause the electronic device to:
identify at least one object included in the frames included in the at least one part,
in-paint the frames such that the at least one object included in the frames is masked from the in-painted frames, and
generate the expanded frames by out-painting the in-painted frames.

7. The electronic device of claim 1, wherein the instructions, when executed by the at least one processor individually or collectively, further cause the electronic device to:
identify whether other expanded frames with respect to the video are stored in a server,
based on the other expanded frames with respect to the video being stored in the server:
receive the other expanded frames, and
display, using the projection assembly, the other expanded frames at the time when the at least one part including the frames is displayed, and
based on the other expanded frames with respect to the video not being stored in the server:
generate the expanded frames, and
display, using the projection assembly, the expanded frames at the time when the at least one part including the frames is displayed.

8. The electronic device of claim 1, wherein the instructions, when executed by the at least one processor individually or collectively, further cause the electronic device to:
provide a notification for informing of the remaining time.

9. A method of an electronic device, the method comprising:
obtaining, from an external electronic device using communication circuitry, first information for displaying a video to be played through a display of the external electronic device;
identifying, based on the first information, at least one part of the video expandable by out-painting frames included in the at least one part of the video;
identifying a remaining time for the electronic device to out-paint the frames included in the at least one part of the video, to a time at which the frames included in the at least one part of the video are played through the display, through the display of the external electronic device;
determining, based on the remaining time, a size of expanded frames to be out-painted from the frames included in the at least one part;
generating, during the remaining time, the expanded frames by out-painting the frames; and
displaying, using a projection assembly, the expanded frames including a black area partially overlapping the video displayed through the display of the external electronic device, at a time when the at least one part including the frames is displayed.

10. The method of claim 9, further comprising:
determining, based on the remaining time, quality of the expanded frames to be out-painted from the frames included in the at least one part.

11. The method of claim 10, wherein the quality of the expanded frames includes resolution, a frame rate, brightness, color, and/or bitrate.

12. The method of claim 9, further comprising:
transmitting, using the communications circuitry, information on the expanded frames to a server,
wherein the information on the expanded frames is used for another electronic device including another projection assembly to display the expanded frames, during the video being displayed, without generating other expanded frames.

13. The method of claim 9, wherein the at least one part of the video depicts a natural environment, landscape, and/or crowd as a background.

14. The method of claim 9, further comprising:
identifying at least one object included in the frames included in the at least one part;
in-painting the frames such that the at least one object included in the frames is masked from the in-painted frames; and
generating the expanded frames by out-painting the in-painted frames.

15. The method of claim 9, further comprising:
identifying whether other expanded frames with respect to the video is stored in a server;
based on the other expanded frames with respect to the video being stored in the server:
receiving the other expanded frames, and
displaying, using the projection assembly, the other expanded frames at the time when the at least one part including the frames is displayed; and
based on the other expanded frames with respect to the video not being stored in the server:
generating the expanded frames, and
displaying, using the projection assembly, the expanded frames at the time when the at least one part including the frames is displayed.

16. The method of claim 9, further comprising:
providing a notification for informing of the remaining time.

17. A non-transitory computer readable storage medium storing one or more programs including instructions, that when executed by at least one processor of an electronic device, cause the electronic device to:
obtain, from an external electronic device using communication circuitry, first information for displaying a video to be played through a display of the external electronic device,
identify, based on the first information, at least one part of the video expandable by out-painting frames included in the at least one part of the video,
identify a remaining time for the electronic device to out-paint the frames included in the at least one part of the video, to a time at which the frames included in the at least one part of the video are played through the display, through the display of the external electronic device,
determine, based on the remaining time, a size of expanded frames to be out-painted from the frames included in the at least one part,
generate, during the remaining time, the expanded frames by out-painting the frames, and
display, using a projection assembly, the expanded frames including a black area partially overlapping the video displayed through the display of the external electronic device, at a time when the at least one part including the frames is displayed.

18. The non-transitory computer readable storage medium of claim 17, wherein the instructions, when executed by the processor of the electronic device, further cause the electronic device to:
determine, based on the remaining time, quality of the expanded frames to be out-painted from the frames included in the at least one part.

19. The non-transitory computer readable storage medium of claim 17, wherein the instructions, when executed by the processor of the electronic device, further cause the electronic device to:
transmit, using the communications circuitry, information on the expanded frames to a server,
wherein the information on the expanded frames is used for another electronic device including another projection assembly to display the expanded frames, during the video being displayed, without generating other expanded frames.

20. The non-transitory computer readable storage medium of claim 17, wherein the at least one part of the video depicts a natural environment, landscape, and/or crowd as a background.

* * * * *